(12) United States Patent
Lekovic et al.

(10) Patent No.: US 6,699,916 B2
(45) Date of Patent: Mar. 2, 2004

(54) RIGID HYBRID POLYURETHANE FOAMS

(75) Inventors: Huzeir Lekovic, Troy, MI (US); Frank V. Billotto, Rochester, MI (US)

(73) Assignee: Dow Global Technologies Inc., Midland, MI (US)

( * ) Notice: Subject to any disclaimer, the term of this patent is extended or adjusted under 35 U.S.C. 154(b) by 171 days.

(21) Appl. No.: 10/055,220

(22) Filed: Oct. 29, 2001

(65) Prior Publication Data

US 2003/0087974 A1 May 8, 2003

(51) Int. Cl.$^7$ ................................. C08J 9/08
(52) U.S. Cl. .............. 521/130; 521/137; 521/170; 428/308.4; 428/319.3; 428/423.1
(58) Field of Search ................. 521/130, 137, 521/170; 428/308.4, 319.3, 423.1

(56) References Cited

U.S. PATENT DOCUMENTS

| | | |
|---|---|---|
| 3,700,752 A | 10/1972 | Hutchinson |
| 4,098,733 A | 7/1978 | Olstowski et al. ........... 521/123 |
| 4,594,366 A | 6/1986 | Taylor et al. ................ 521/137 |
| 5,091,436 A | 2/1992 | Frisch et al. ................. 521/137 |
| 5,271,612 A | 12/1993 | Yada et al. |
| 5,274,006 A | 12/1993 | Kagoshima et al. .......... 521/85 |
| 5,344,856 A | 9/1994 | Klein .......................... 523/403 |
| 5,817,860 A | 10/1998 | Rizk et al. .................... 560/25 |
| 6,040,350 A | 3/2000 | Fukui .......................... 521/135 |

FOREIGN PATENT DOCUMENTS

| | | |
|---|---|---|
| AU | B-38323/93 | 1/1994 |
| EP | 0747442 A2 | 12/1996 |

OTHER PUBLICATIONS

The Dow Chemical Company, Dow Liquid Epoxy Resins, 1966, pp. 1–41.
The Dow Chemical Company, Dow Epoxy Novolac Resins, pp. 1–24 (1998).
CyberTech Chemicals, Ltd., CT 2800 Oligimer Product Data Sheet, pp. 1–2 (1999).
Derwent Information LTD., JP 2000239431 (2000).
Derwent Information LTD., JP 2000063555 (2000).
Derwent Information LTD., JP 2000006287 (2000).
Derwent Information LTD., JP 11263865 (1999).
Derwent Information LTD., US 6040350 (1999).
Derwent Information LTD., JP 09316169 (1998).
Derwent Information LTD., JP 09176358 (1997).
Derwent Information LTD., JP 08109362 (1996).
Derwent Information LTD., JP 07331032 (1996).
ACS Abstract, JP 07256808 (1995).
Derwent Information LTD., JP 07157740 (1995).
ACS Abstract, JP 07024946 (1995).
ACS Abstract, JP 06226896 (1994).
Derwent Information LTD., JP 06171001 (1994).
Derwent Information LTD., JP 06170997 (1994).
Derwent Information LTD., AU 645735 (1994).
Derwent Information LTD., JP 05194781 (1993).
Derwent Information LTD., JP 05194780 (1993).
Derwent Information LTD., US 5271612 (1994).
ACS Abstract, JP 04336239 (1992).
Derwent Information LTD., US 5274006 (1993).

*Primary Examiner*—John M. Cooney, Jr.

(57) ABSTRACT

Rigid polyurethane foams that can be produced at component volumes ratios of less than 4:1 are prepared from an isocyanate component that contains certain polyfunctional (meth)acrylate compounds. These isocyanate components are mixed with a polyol component to produce rigid foams. The foams are particularly suitable for foam-in-place applications, such as for reinforcing structural members of automobiles.

19 Claims, No Drawings

RIGID HYBRID POLYURETHANE FOAMS

BACKGROUND OF THE INVENTION

The present invention relates to rigid polyurethane foams, particularly rigid polyurethane foams that are useful as reinforcement materials, such as in the auto industry.

Rigid foams have been used in the auto and other industries for a number of purposes. For example, rigid foams have been used for structural reinforcement, preventing corrosion and damping sound and vibration. These foams are typically formed by applying a reactive foam formulation to a part and allowing the formulation to foam in place. The part is often already assembled onto a vehicle when the foam is applied. This means that the foam formulation must be easy to mix and dispense, must cure rapidly before it runs off the part, and preferably initiates curing at moderate temperatures. To minimize worker chemical exposure, the formulation is preferably is low in volatile organic compounds, especially volatile isocyanates and amines. The individual components are preferably storage-stable at room temperature for an extended period.

One foaming system for these applications is based on the prepolymer described by Rizk et al. in U.S. Pat. No. 5,817,860. The prepolymer described in that patent is made by reacting an isocyanate with a monofunctional alcohol and a polyol. Foams are made from this prepolymer by reacting it with water. While good quality foam can be made using this approach, it has several drawbacks. Because the prepolymer is cured with a water stream, the volume ratio of the reactants (prepolymer and water) is often quite high, such as 15:1 or more. Much of the commercially available dispensing equipment cannot handle such high component ratios. This can be alleviated somewhat by replacing the water with a higher equivalent weight polyol. But the equivalent weight of the polyol must be so high, if volume ratios are to be reduced significantly, that the resulting foam is flexible, unstable, or both.

It would therefore be desirable to provide a rigid polyurethane system that can be applied at lower volume ratios and which provides stable, rigid foam.

SUMMARY OF THE INVENTION

In one aspect, this invention is a method of making a rigid hybrid polyurethane foam, comprising mixing an isocyanate component with a polyol component in the presence of (i) a blowing agent, (ii) at least one polyfunctional (meth)acrylate compound containing an average of at least 2 acrylate or methacrylate groups per molecule and a weight per acrylate or methacrylate group of about 300 daltons or less and (iii) at least one catalyst for the reaction of a polyol or water with a polyisocyanate and, subjecting the mixture to conditions sufficient to cause the isocyanate component and polyol component to react and the polyfunctional (meth)acrylate compound to polymerize, thereby forming a rigid hybrid polyurethane foam having a bulk density of 45 pounds per cubic foot (720 kg/m$^3$) or less.

In a second aspect, this invention is a two-component reactive system for making a hybrid polyurethane foam, comprising (a) a isocyanate component that contains at least one polyisocyanate compound ant at least one polyfunctional (meth)acrylate compound containing an average of at least 2 acrylate or methacrylate groups per molecule and a weight per acrylate or methacrylate group of about 300 daltons or less; and (b) a polyol component that contains one or more polyols and an effective amount of a blowing agent;

wherein the system is further characterized by (i) a volume ratio of isocyanate component to polyol component of between 1:4 to 4:1, (ii) a ratio of isocyanate groups in the isocyanate component to isocyanate-reactive groups in the polyol component from about 0.8:1 to about 1.5:1 and (iii) at least one of the isocyanate component or the polyol component contains a catalyst for the reaction of an isocyanate with a polyol or water.

The process of this invention provides a method by which rigid hybrid polyurethane foam can be prepared at convenient mix ratios while still allowing the production good quality, rigid foam. The method and resulting foam is especially suitable for making foamed-in-place reinforcing and sound- or vibration-dampening foam, especially for automotive applications, as it is easily foamed in place where reinforcement is needed. Through the selection of appropriate catalysts, the reactive system can be formulated with low levels of volatile compounds, in particular low levels of volatile amines and isocyanates.

DETAILED DESCRIPTION OF THE INVENTION

In this invention, an isocyanate component and a polyol component are reacted in the presence of a blowing agent, catalyst and a polyfunctional (meth)acrylate compound to form a rigid foam. The "polyfunctional (meth)acrylate compound" is a compound or mixture of compounds that have a plurality of polymerizable acrylate or methacrylate groups. The polyfunctional (meth)acrylate compounds preferably each have at least 2 such groups per molecule and preferably have on average from about 2.2 to about 5 such groups per molecule. It is more preferred that the polyfunctional (meth) acrylate compounds contain an average of at least 2.5, more preferably at least 2.8, such polymerizable acrylate or methacrylate groups per molecule. The polyfunctional (meth) acrylate compound has a weight of up to 300 daltons per acrylate or methacrylate group, preferably between about 100 and 200, especially between about 100 and 150. It is preferred that the polyfunctional (meth)acrylate compound be substantially devoid of groups (i.e., hydroxyl, primary or secondary amine, carboxylic acid, thiol groups, among others) that will react with an isocyanate group under the conditions of the foaming reaction.

The polyfunctional (meth)acrylate compound will typically be incorporated into the isocyanate component. In order to facilitate mixing and the preparation of a good quality hybrid foam, it is preferred that the polyfunctional (meth)acrylate compound be miscible with the isocyanate component at the proportions that are present.

Suitable polyfunctional (meth)acrylate compounds include esters of acrylic acid and/or methacrylic acid and one or more polyalcohols that have on average at least 2 alcohol groups per molecule. The polyols are generally of low equivalent weight so that the weight of the polyfunctional (meth)acrylate compound per acrylate or methacrylate group is as described before. These polyfunctional (meth) acrylate compounds can be prepared by reacting the acid, corresponding acid halide or corresponding alkyl ester (especially methyl or ethyl ester) with the polyalcohol in the presence of an esterification catalyst or transesterification catalyst. Suitable polyfunctional (meth)acrylate compounds are commercially available under the trade name Sartomer™, and include trimethylolpropane trimethacrylate (Sartomer 350), trimethylolpropanetriacrylate, di(trimethylolpropane) tetracrylate (Sartomer 355), di(trimethylolpropane) tetramethacrylate and similar compounds.

The amount of polyfunctional (meth)acrylate compound that is used is selected in conjunction with the amounts of the other components so that the resulting foam is rigid and stable. In the preferred two-component method of making the foam, the amount of the polyfunctional (meth)acrylate compound is also selected in conjunction with the amounts of other components so the volume ratio of the isocyanate component to the polyol component is within the ranges described below. The precise amount that is required will depend on the relative equivalent weights of the isocyanate component and the polyols in the polyol component. However, these volume ratios are generally achieved when the polyfunctional (meth)acrylate compound constitutes from about 1, preferably about 3, more preferably about 5, to about 35, preferably to about 30 percent of the total weight of the foam formulation. To obtain a stable, rigid foam, the polyfunctional (meth)acrylate compound preferably constitutes at least about 15% of the total weight of the foam formulation. When, as preferred, the polyfunctional (meth)acrylate compound is incorporated into the isocyanate component, it will generally constitute from about 10, preferably from about 20, more preferably about 25 to about 60, preferably to about 50, more preferably to about 45 percent of the total weight of the isocyanate component.

The isocyanate component comprises one or more polyisocyanate compounds, and preferably contains the polyfunctional (meth)acrylate compound. Suitable polyisocyanate compounds include aromatic, aliphatic and cycloaliphatic polyisocyanates. Aromatic polyisocyanate compounds are generally preferred based on cost, availability and properties, although aliphatic polyisocyanates are sometimes preferred in instances where stability to light is important. Exemplary polyisocyanate compounds include, for example, m-phenylene diisocyanate, 2,4- and/or 2,6-toluene diisocyanate (TDI), the various isomers of diphenylmethanediisocyanate (MDI), hexamethylene-1,6-diisocyanate, tetra methylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"-triphenylmethane diisocyanate, polymethylene polyphenylisocyanates, hydrogenated polymethylene polyphenylisocyanates, toluene-2,4,6-triisocyanate, and 4,4'-dimethyldiphenylmethane-2,2',5,5'-tetraisocyanate. Among the foregoing, preferred polyisocyanate compounds include TDI, MDI and the so-called polymeric MDI products, which are a mixture of polymethylene polyphenylene isocyanates in monomeric MDI. Especially suitable polymeric MDI products have a free MDI content of from about 5 to about 40% by weight, more preferably about 10 to about 25% by weight, and have an average functionality (number of isocyanate groups per molecule) of about 2.7 to 4.0, more preferably about 2.8 to about 3.4. Such polymeric MDI products are available from The Dow Chemical Company under the trade name PAPI®.

In addition, an isocyanate-terminated prepolymer can be used as part of or the entire isocyanate component. Such prepolymers are prepared by reacting an excess of a polyisocyanate compound (such as are described above) with one or more polyols or a mixture of one or more polyols with one or more monols. The prepolymer advantageously has an isocyanate equivalent weight of from about 150, preferably from about 175, to about 500, preferably to about 350, more preferably to about 250. These isocyanate equivalent weights correspond to NCO contents of from about 28–8.4%, preferably from 24–12%, more preferably from about 24–16.8%. The use of prepolymer provides the advantages of a somewhat higher isocyanate equivalent weight and reduced amounts of volatile isocyanate compounds.

The polyol(s) used in making the isocyanate-terminated prepolymer has an average at least about 2, advantageously about 2 to about 6, especially about 2 to about 3 and even more especially about 2 to about 2.5 hydroxyl groups per molecule (functionality). The equivalent weight per hydroxyl group can vary widely, so long as the prepolymer has the desired equivalent weight. The equivalent weight of each polyol may range from about 31 to 1500 or more, but is preferably below about 500, more preferably below about 300 and even more preferably about 200 or below.

Suitable polyols for use in making an isocyanate-terminated prepolymer include compounds such as alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), glycerine, trimethylolpropane, tertiary amine-containing polyols such as triethanolamine, triisopropanolamine, and ethylene oxide and/or propylene oxide adducts of ethylene diamine, toluene diamine and the like, polyether polyols, polyester polyols, and the like. Among the suitable polyether polyols are polymers of alkylene oxides such as ethylene oxide, propylene oxide and 1,2-butylene oxide or mixtures of such alkylene oxides. Preferred polyethers are polypropylene oxides or polymers of a mixture of propylene oxide and a small amount (up to about 12 weight percent) of ethylene oxide. These preferred polyethers can be capped with up to about 30% by weight ethylene oxide.

Polyester polyols are also suitable in making the prepolymer. These polyester polyols include reaction products of polyols, preferably diols, with polycarboxylic acids or their anhydrides or halides, preferably dicarboxylic acids or dicarboxylic acid anhydrides. The polycarboxylic acids, anhydrides or acid halides may be aliphatic, cycloaliphatic, aromatic and/or heterocyclic and may be substituted, such as with halogen atoms. The polycarboxylic acids may be unsaturated. Examples of these polycarboxylic acids, anhydrides and acid halides include succinic acid, adipic acid, terephthalic acid, isophthalic acid, trimellitic acid, maleic acid, and fumaric acid, and their corresponding anhydrides and acid halides. The polyols used in making the polyester polyols preferably have an equivalent weight of about 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols such as those sold by The Dow Chemical Company under the trade name "Tone" are also useful.

Preferred polyols for making the prepolymer are alkylene glycols, glycol ethers of up to about 75 equivalent weight, glycerine, trimethylolpropane, triethanolamine, triisopropanolamine, and poly(propylene oxide) polyols of up to about 200 equivalent weight.

An especially preferred prepolymer is made from an excess of an organic polyisocyanate compound, a hydroxy-functional acrylate or methacrylate, and a polyol. The equivalent ratio of the hydroxy-functional acrylate or methacrylate to polyol is advantageously from about 0.5:1, preferably from about 0.75:1 and more preferably from about 1.25:1 to about 4:1, preferably to about 3:1, even more preferably to about 2:1. The total number of equivalents of hydroxy-functional acrylate or methacrylate plus polyol(s) to the equivalents of starting organic polyisocyanate is advantageously such that the prepolymer has an isocyanate equivalent weight of from about 150, preferably from about 175, to about 500, preferably to about 350, more preferably to about 250. As before, these isocyanate equivalent weights correspond to NCO contents of from about 28–8.4%, preferably from 24–12%, more preferably from about 24–16.8%.

Hydroxy-functional acrylates and methacrylates used in making the especially preferred prepolymer contain an acrylate ($CH_2$=CH—C(O)—) or methacrylate ($CH_2$=C($CH_3$)—C(O)—) group and an isocyanate-reactive hydroxyl group. Suitable hydroxy-functional acrylates and methacrylates include 2-hydroxyethyl acrylate, 2-hydroxyethyl methacrylate (HEMA), 2-hydroxylpropyl acrylate, 2-hydroxypropyl methacrylate, 4-hydroxy-n-butyl acrylate, 2-hydroxy-n-butyl acrylate, 2-hydroxy-n-butyl methacrylate, 4-hydroxy-n-butyl methacrylate, poly(oxyethylene)- and/or poly(oxypropylene)-esters of acrylic or methacrylic acid, wherein the number of oxyethylene and/or oxypropylene groups is preferably from about 2 to about 10, and the like. Of the foregoing, the methacrylates are preferred, especially when the polyol component contains primary amine compounds. HEMA is especially preferred.

The prepolymer is conveniently prepared by mixing the organic polyisocyanate, polyol and hydroxy-functional acrylate or methacrylate (when used) and subjecting the mixture to conditions such that the isocyanate and hydroxyl groups react to form the prepolymer. Generally, the reaction time is at least about 10 minutes to at most about 48 hours. The temperature of the mixing and reaction step may vary over a large range, but generally is limited so that reactants do not decompose, the acrylate or methacrylate groups do not polymerize to any significant extent and the reaction proceeds at a practicable rate. A preferred temperature is from about 20–75° C. The reactants are generally contacted under a dry atmosphere and preferably under nitrogen or other inert atmosphere. It is preferred to prepare the prepolymer in the absence of materials and conditions such as free radical initiators that promote the polymerization of the acrylate and/or methacrylate groups, when they are present.

A catalyst may be and preferably is used in making the prepolymer. Suitable catalysts include those described by U.S. Pat. No. 4,390,645, incorporated herein by reference. Representative catalysts include: (a) tertiary amines, such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine,4,4'-(oxydi-2,1-ethanediyl)bis and triethylenediamine;
(b) tertiary phosphines, such as trialkylphosphines and dialkylbenzylphosphines;
(c) chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni;
(d) acidic metal salts of strong acids, such as ferric chloride, stannic chloride, stannous chloride, antimony trichloride, bismuth nitrate and bismuth chloride;
(e) strong bases, such as alkali and alkaline earth metal hydroxides, alkoxides and phenoxides;
(f) alcoholates and phenolates of various metals, such as Ti(OR)$_4$, Sn(OR)$_4$ and Al(OR)$_3$, wherein R is alkyl or aryl, and the reaction products of the alcoholates with carboxylic acids, beta-diketones and 2-(N,N-dialkylamino)alcohols;
(g) salts of organic acids with a variety of metals, such as alkali metals, alkaline earth metals, Al, Sn, Pb, Mn, Co, Ni and Cu including, for example, sodium acetate, stannous octoate, stannous oleate, lead octoate, metallic driers, such as manganese and cobalt naphthenate; and
(h) organometallic derivatives of tetravalent tin, trivalent and pentavalent As, Sb and Bi and metal carbonyls of iron and cobalt.

Catalysts are typically used in small amounts. For example, the total amount of catalyst used in making the prepolymer composition may be about 0.0015 to about 5, preferably from about 0.01 to about 1 percent by weight.

The isocyanate component may contain a plasticizer. When the isocyanate component includes a prepolymer, the plasticizer may also be added after the prepolymer is made, or may be present during its formation (as may the polyfunctional (meth)acrylate compound). The plasticizer performs several functions, such as reducing the viscosity so the isocyanate component is easier to process and handle, modifying the rate of the foaming reaction, or softening or otherwise modifying the physical properties of the resulting polyurethane foam. The plasticizer is generally devoid of groups that react with the organic polyisocyanate and the hydroxy-functional acrylate or methacrylate and polyol (when the plasticizer is present during prepolymer formation). Examples of plasticizers include phthalates (e.g., dioctyl phthalate, diisooctyl phthalate, dimethyl phthalate, dibutyl phthalate and mixtures of phthalates, such as those sold by BASF Corporation, Mt Olive, N.J., under the trade name PLATINOL™ (such as Platinol™ 79P)), phosphates (e.g., tributyl phosphate, triphenyl phosphate and cresyl diphenyl phosphate), chlorinated biphenyls, and aromatic oils such as VYCUL™ U-V (sold by Crowley Chemicals) and Jayflex™ L9P (sold by Exxon Chemicals). The amount of plasticizer, when employed, may range over a wide range depending on the foam properties desired. Generally, the plasticizer, when present, ranges from about 1 percent to at most about 50, preferably from about 15 to about 45 percent by weight of the isocyanate component.

The isocyanate composition may also contain a surfactant, such as those described by U.S. Pat. No. 4,390,645, which is incorporated by reference. The surfactant is typically used in making prepolymers to help compatibilize the components. In addition, the surfactant may be one that plays a beneficial role in forming a foam from the isocyanate component. Examples of surfactants include nonionic surfactants and wetting agents, such as those prepared by the sequential addition of propylene oxide and then ethylene oxide to propylene glycol, solid or liquid organosilicones, polyethylene glycol ethers of long chain alcohols, tertiary amine or alkylolamine salts of long chain alkyl acid sulfate esters, alkyl sulfonic esters and alkyl arylsulfonic acids. The surfactants prepared by the sequential addition of propylene oxide and then ethylene oxide to propylene glycol are preferred, as are the solid or liquid organosilicones. Non-hydrolyzable liquid organosilicones are more preferred. When a surfactant is used, it is typically present in an amount of about 0.0015 to about 1 percent by weight of the prepolymer component.

The fully formulated isocyanate component advantageously has an isocyanate equivalent weight of from about 150, preferably from about 175, to about 1000, preferably to about 700, more preferably to about 500. The isocyanate functionality (exclusive of the polyfunctional (meth)acrylate compound and non-reactive materials such as plasticizers, surfactants and the like) is advantageously at least about 2.0, preferably at least 2.5, to about 4.0, preferably to about 3.5, more preferably to about 3.2 isocyanate groups/molecule on average.

The isocyanate component also preferably contains less than 25%, more preferably less than about 12%, especially 10% by weight or less of monomeric diisocyanates. By "monomeric diiisocyanates", it is meant isocyanate-containing species that (i) do not contain urethane, urea, biuret or carbodiimide linkages, (ii) have a molecular weight of 300 or less and (iii) which are not otherwise formed in the reaction of two or more isocyanate-containing compounds. Having such a low monomeric diisocyanate content substantially reduces the risks of polyisocyanate inhalation exposure, so costly engineering controls such as downdraft ventilation can be substantially reduced or potentially eliminated.

The polyol component includes one or more polyols. Suitable polyols are compounds having at least two isocyanate-reactive hydroxyl groups per molecule. Among the polyols that are suitable for use in the polyol component are those described above with respect to the isocyanate-terminated prepolymer. The polyol component will most typically include a blend of two or more different polyols.

The equivalent weight and functionality of the individual polyols can vary widely, provided the volume ratios and equivalent ratios discussed below are met. Although it is important in most rigid polyurethane foam formulations that the polyol(s) have a high average functionality and low equivalent weight, that is not necessarily the case in this invention, for reasons that are more fully explained below. The functionality (average number of isocyanate-reactive groups/molecule) of the individual polyols can range as low as about 1.8 or as high as 8 or more, and the equivalent weight of the individual polyols can range from as low as about 31 to as high as 3000 or more. These same values apply to the average functionality of all the polyols and amine-functional compounds (if present) in the polyol component (but exclusive of the polyfunctional (meth)acrylate compound, other non-isocyanate reactive materials, reactive catalysts as described below, and reactive blowing agents, if present).

However, in most cases, the average equivalent weight of the polyols and amine-functional compounds (if present) will tend to be somewhat higher than is typical in making rigid polyurethane foams. This is primarily for two reasons. First, the polyfunctional (meth)acrylate compound is typically contained in the isocyanate component. This tends to increase the overall weight and volume of the isocyanate compound while increasing isocyanate equivalent weight (of the formulated isocyanate component). In order to obtain the desired volume ratios, the average equivalent weight of the polyol side must increase as well. Second, the polyfunctional (meth)acrylate compound is believed to polymerize during the foaming reaction to form a cross-linked polymer. The cross-linked polymer is believed to impart rigidity to the foam. Consequently, it is not necessary to use low equivalent weight polyols to make the foam rigid, as this function is performed instead by the polymerized polyfunctional (meth) acrylate compound. This allows the use of higher equivalent weight polyols, while allows the desired volume ratios to be achieved while still producing a rigid, stable, closed cell foam. Of course, the amount of polyfunctional (meth) acrylate compound that is used also plays a role, with lower average equivalent weight polyols and amine-functional compounds being more preferred as the amount of polyfunctional (meth)acrylate compound is reduced.

Thus, a preferred average equivalent weight is from about 300, more preferably from about 400, even more preferably from about 500, especially from about 1000, to about 4000, more preferably to about 3000, even more preferably to about 2500, especially to about 1500, exclusive of the polyfunctional (meth)acrylate compound, other non-isocyanate reactive materials, reactive catalysts as described below, and reactive blowing agents, if present).

Thus, particularly suitable polyols for use in this invention are those having an equivalent weight of about 500 to 5000, preferably from about 1000 to about 3000, and more preferably from about 1500 to about 3000. Such polyols are preferably polyether polyols having on average from about 1.8 to about 4, especially from about 2 to about 3 hydroxyl groups per molecule. It more preferably is a polypropylene oxide) that may be end-capped with up to 30% (by weight of the polyol) of poly(ethylene oxide). The polyol may contain dispersed polymer particles. These materials are commercially known and are commonly referred to as "polymer polyols" (or, sometimes "copolymer polyols"). The dispersed polymer particles may be, for example, polymers of a vinyl monomer (such as styrene, acrylonitrile or styrene-acrylonitrile particles), polyurea particles or polyurethane particles. Polymer or copolymer polyols containing from about 2 to about 50% or more by weight dispersed polymer particles are suitable. When used, this polymer or copolymer polyol may constitute up to about 45%, preferably from about 5 to about 40%, of the weight of all isocyanate-reactive materials in the polyol component.

The polyether polyols described above may be made using production methods such that they contain reduced levels of terminal unsaturation (such as less than 0.04 meq/g, preferably from about 0.005 to about 0.035 meq/g). Such production methods include the use of low temperature, alkali metal-catalyst polymerizations, CsOH-catalyzed polymerizations, so-called double metal cyanide-catalyzed polymerizations, various acid-finishing techniques, and the like.

The polyol component may include at least a small amount of a tertiary amine-containing polyol and/or an amine-functional compound. The presence of these materials tends to increase the reactivity of the polyol component during the early stages of its reaction with the isocyanate component. This in turn helps the reaction mixture to build viscosity more quickly when first mixed and applied without unduly decreasing cream time, and thus reduces run-off or leakage.

Such tertiary amine-containing polyols include, for example, triisopropanol amine, triethanolamine and ethylene and/or propylene oxide adducts of ethylene diamine, toluene diamine or aminoethylpiperazine having a molecular weight of up to about 3000, preferably up to about 2000. When present, tertiary amine-containing polyols may constitute a minor or a major component of the polyol component. (In this invention, a "major" or "main" amount or a "major" or "main" component is one constituting at least 50 weight percent of the polyol component as a whole.) For example, the tertiary amine-containing polyol may constitute from about 1 to about 80% by weight of all polyols.

The amine-functional compound is a compound having at least two isocyanate-reactive groups, of which at least one is a primary or secondary amine group. Among these are monoethanolamine, diethanolamine, monoisopropanol amine, diisopropanol amine and the like, and aliphatic polyamines such as aminoethylpiperazine. Also included among these compounds are the so-called aminated polyethers in which all or a portion of the hydroxyl groups of a polyether polyol are converted to primary or secondary amine groups. Suitable such aminated polyethers are sold by Huntsman Chemicals under the trade name JEFFAMINE®. Typical conversions of hydroxyl to amine groups for these commercial materials range from about 70–95%, and thus these commercial products contain some residual hydroxyl groups in addition to the amine groups. Preferred among the aminated polyethers are those having a weight per isocyanate-reactive group of about 100–1700 daltons, especially about 250–1500 daltons, and having 2–4 isocyanate-reactive groups per molecule.

These amine-functional compounds advantageously constitute no greater than about 25 weight percent, preferably from about 0.25 to about 15 weight percent of the total weight of the polyol component.

The foam is made in the presence of a blowing agent. The blowing agent is preferably incorporated into either the isocyanate component or the polyol component, preferably the latter. Although physical blowing agents such as fluorocarbons, hydrofluorocarbons, chlorocarbons, chlorofluorocarbons and hydrochlorofluorocarbons can be used, the preferred blowing agents are reactive blowing agents that produce carbon dioxide during the foaming reaction. Among these reactive blowing agents are materials such as formate-blocked amines and water. The formate-blocked amines decompose under the foaming conditions to produce carbon dioxide. Water reacts with the polyisocyanate to form carbon dioxide gas that causes the reaction mixture to expand. The blowing agent is used in an amount sufficient to provide the foam with the aforementioned densities. When water is used as the blowing agent, about 0.5 to about 10, preferably from about 3 to about 8 parts by weight are used per 100 parts of polyol component.

The foam is also made in the presence of a catalyst for the reaction of the isocyanate groups with the polyol or water (if present). Most typically, the catalyst will be incorporated into the polyol component. Suitable catalysts are described above with respect to the making of the prepolymer. However, tertiary amine catalysts are preferred, and especially preferred are the so-called "reactive" amine catalysts that contain a hydroxyl or primary or secondary amine group that can react with an isocyanate to become chemically bonded into the foam. Among these especially preferred catalysts are N,N,N-trimethyl-N-hydroxyethyl-bis(aminoethyl) ether (available from Huntsman Chemical under the trade name ZF-10) and dimethyl 1-2 (2-aminoethoxy) ethanol (available from Nitrol-Europe under the trade name NP-70), and those sold by Air Products under the trade names Dabco™ 8154 and Dabco™ T.

The amount of catalyst is selected to provide a desired reaction rate. The amount that is used will depend somewhat on the particular catalyst. Generally, the amounts described before with respect to the making of the prepolymer are suitable. However, when the preferred reactive amine catalysts are used, somewhat greater amounts can be used. For these reactive amine catalysts, the amount used preferably ranges from about 1 to about 15, more preferably from about 2 to about 13 percent of the total weight of the polyol component.

In order to promote the polymerization of the polyfunctional (meth)acrylate compound, the reaction is preferably conducted in the presence of a free radical initiator. This is generally incorporated into the component that doe not contain the polyfunctional (meth)acrylate compound. These compounds are well known, and include hydrogen peroxide, various organic peroxides, peresters and percarbonates, the so-called "azo" type free radical initiators, various persulfates, and redox systems. Organic peroxides, peresters and percarbonates are preferred. Often, a promoter compound such as cobalt naphthenate is used in conjunction with these free radical initiator compounds. Particular free radical initiators are preferably selected so that they are active at the temperatures generated by the exothermic reaction between the isocyanate component and the various isocyanate-reactive materials in the polyol component. Suitable amounts are from about 0.01 to about 3 percent of the total weight of the foam formulation.

In addition, the polyol component and/or the prepolymer component can contain various auxiliary components as may be useful in making a rigid foam, such as surfactants, fillers, colorants, odor masks, flame retardants, biocides, antioxidants, UV stabilizers, antistatic agents, thixotropic agents and cell openers.

Suitable surfactants include commercially available polysiloxane/polyether copolymers such as Tegostab (trademark of Goldschmidt Chemical Corp.) B-8462 and B-8404, and DC-198 and DC-5043 surfactants, available from Dow Corning.

Examples of suitable flame retardants include phosphorous compounds, halogen-containing compounds and melamine.

Examples of fillers and pigments include calcium carbonate, titanium dioxide, iron oxide, chromium oxide, azo/diazo dyes, phthalocyanines, dioxazines and carbon black.

Examples of UV stabilizers include hydroxybenzotriazoles, zinc dibutyl thiocarbamate, 2,6-ditertiarybutyl catechol, hydroxybenzophenones, hindered amines and phosphites.

Examples of cell openers include silicon-based antifoamers, waxes, finely divided solids, liquid perfluorocarbons, paraffin oils and long chain fatty acids.

The foregoing additives are generally used in small amounts, such as from about 0.01 percent to about 1 percent by weight of the foam formulation.

The foam of the invention is most conveniently prepared by reacting a two-component system that includes an isocyanate component and a polyol component. Alternatively, but less preferably, the various components can be fed individually or in various combinations to a mixing/dispensing head as is well known in the art. In the two-component system, the volume ratios of the components are between 1:4 to 4:1, preferably between 1:3 to 3:1, more preferably from about 1:2 to 2:1. The ratio of isocyanate groups in the isocyanate component to isocyanate-reactive groups in the polyol component is from 0.8:1, preferably from 0.9:1, more preferably from 0.98:1 to about 1.5:1, preferably to about 1.3:1, more preferably to about 1.2:1.

To form a foam, the polyol(s) and polyisocyanate(s) are mixed in the presence of (i) a blowing agent, (ii) at least one polyfunctional (meth)acrylate compound containing an average of at least 2 acrylate or methacrylate groups per molecule and a weight per acrylate or methacrylate group of about 300 daltons or less and (iii) at least one catalyst for the reaction of a polyol or water with a polyisocyanate a catalyst for the reaction of the polyol or water with an isocyanate.

Conditions are such that (1) the isocyanate groups in the prepolymer component react with the polyols (and reactive blowing agents and catalysts when present) for form a polyurethane polymer, (2) the acrylate and/or methacrylate groups on the polyfunctional (meth)acrylate compound polymerize (together with acrylate and/or methacrylate groups that are present in the most preferred prepolymer component) and (3) gasses are generated so that the mixture cures for form a stable, rigid foam that is most preferably closed celled.

This is generally achieved by mixing the polyol and isocyanate components and allowing the reactants to react and form a foam. The components may be pre-heated if desired. Although this invention is not limited to any theory, it is believed that as the prepolymer reacts with the polyol component, the heat that is released causes (in conjunction with the free radical initiator, when used) the acrylate and/or methacrylate groups to polymerize, thus forming a cross-linked acrylate or methacrylate polymer dispersed within a polyurethane matrix. When the prepolymer is acrylate- or methacrylate functional as most preferred, this acrylate or methacrylate polymer is believed to become covalently bonded to the prepolymer molecules as well and thus are incorporated into the polyurethane polymer matrix. An advantage of the invention is that because of the low volume ratios of the polyol and isocyanate components, a variety of commonly available mixing and dispensing equipment can be used. In the applications of particular interest, the mixed isocyanate and polyol components are dispensed onto a part or assemblage where localized reinforcement, corrosion protection, sound insulation or vibration dampening is desired. The formulation then cures in place, generally without the further application of additional heat or energy for curing, although heating can be used if desired to speed and/or complete the cure. Alternately, the foam can be formed separately and then glued or otherwise attached to the structural member. It is usually not necessary to apply heat to effect a full expansion and cure, although this may be done if desired. Similarly, it is usually not necessary to post-cure the foam, although it may be desired in some cases.

The density of the product foam is no greater than 45 pounds/cubic foot (720 kg/m$^3$), and preferably is from about 1 (16), more preferably from about 2 (32), even more preferably from about 4 (64) pcf (kg/m$^3$) to about 30 (480), more preferably to about 20 (320), even more preferably to about 15 (240) pcf (kg/m$^3$). The foam is typically rigid and dimensionally stable, and preferably contains mainly closed cells.

The foam of the invention can be used in a variety of applications to structurally stiffen or reinforce areas to which it is applied. Load beams, pillars, rocker panels, roof rails and headers, cross members, and the like are examples of automotive body structural components that benefit from reinforcement from the foam of this invention. Many of these components are hollow or otherwise define a cavity. In some instances, the entire cavity will be filled by the foam. In other instances, the cavity may be only partially filled to provide increased stiffness or reinforcement in some localized area. In other instances, the foam of the invention may be applied to an area where two structural members meet, such as where vertical structural members meet horizontal structural members.

The following examples are provided to illustrate the invention, but are not intended to limit the scope thereof. All parts and percentages are by weight unless otherwise indicated.

EXAMPLES 1 AND 2

A. Preparation Isocyanate-terminated Prepolymer

An plasticized isocyanate-terminated prepolymer is made by mixing the following components together under a nitrogen atmosphere and heating at 55° C. until a constant NCO content is obtained:

| Component | Parts by Weight | Equivalent Weight | Functionality |
|---|---|---|---|
| HEMA | 5.96 | 131 | 1 |
| 400 MW Poly(propylene oxide) diol | 5.416 | 200 | 2 |
| Polymeric MDI | 53.624 | 141 | 3.2 |
| Plasticizer (Jayflex ™ L9P) | 35 | — | Plasticizer |

The resulting plasticized prepolymer has a % NCO of 12.93 weight percent, an equivalent weight of 325 and an average functionality (exclusive of plasticizer) of 2.92 isocyanate groups/molecule.

B. Preparation of Polyol Component

A polyol/blowing agent/catalyst/surfactant blend is made by mixing the following components at room temperature:

| Component | Parts by Weight | Equivalent Weight | Functionality |
|---|---|---|---|
| Polyether polyol (Specflex ™ NC 700, from Dow Chemical) | 42.45 | 2777 | 3 |
| Formic acid-blocked amine catalyst (DABCO 8154, from Air Products) | 10 | 112 | Catalyst and chemical blowing agent |
| Polyether polyol (PG 76–120, from Arch Chemicals) | 30.550 | 467.5 | 3 |
| Amine-terminated polyether | 8.0 | 200 | 2 |
| Amine-terminated polyether | 5 | 1000 | 2 |
| Catalyst (SPI 847 from Specialty Products International) | 1.5 | | Catalyst |
| Organotin Catalyst (UL-1, from Air Products) | 0.5 | | Catalyst |
| Organosilicone Surfactant (Tegostab B-8404, Goldschmidt) | 1 | — | Surfactant |
| Water | 1.0 | | Reactive blowing agent |
| Co Naphthenate | 0.5 | | Promoter |

The resulting polyol blend has an equivalent weight of 305.

C. Manufacture of Foam Example 1

An isocyanate component is prepared by blending 25.68 parts by weight of the prepolymer from A above with 15 parts of trimethylolpropane trimethacrylate (Sartomer™ SR 350, from Sartomer Corporation) and 0.5 parts t-butyl peroxide. The resulting blend is mixed with the polyol component from B above at a weight ratio of 41.18 to 26.18. Mixing is done at room temperature using a mechanical mixer. The mixed components are poured into an open container and allowed to cure at room temperature. The resulting foam is closed-cell and rigid. It has a density of 6.66 pounds per cubic foot (106.6 kg/m$^3$).

D. Manufacture of Foam Example 2

An isocyanate component is prepared by blending 27.03 parts by weight of the prepolymer with 23.14 parts of Sartomer™ SR 350 and 0.38 parts t-butyl peroxide. The resulting blend is mixed with the polyol component from B above at a weight ratio of 50.55 to 23.57, under the conditions described in C above. The resulting foam is closed-cell and rigid, with a density of 7.44 pounds per cubic foot (119 kg/m³).

When insufficient amounts of the polyfunctional (meth) acrylate compound are used, and/or the polyfunctional (meth)acrylate does not polymerize sufficiently (due to, for example, insufficient quantities of catalyst or improper curing conditions), flexible, dimensionally unstable foams are made.

EXAMPLES 3–6

A. Preparation of Isocyanate-terminated Prepolymer

A polyisocyanate-terminated prepolymer is made by mixing the following components together under a nitrogen atmosphere and heating at 55° C. until a constant NCO content is obtained:

| Component | Parts by Weight | Equivalent Weight | Functionality |
|---|---|---|---|
| HEMA | 5.96 | 131 | 1 |
| 400 MW Poly(propylene oxide) | 5.416 | 200 | 2 |
| Polymeric MDI | 55.0 | 141 | 3.2 |
| Platinol ™ 79 P | 35.0 | — | Plasticizer |

B. Preparation of Polyol Masterbatch

A polyol component is made by mixing the following ingredients at room temperature:

| Component | Parts by Weight | Equivalent Weight | Functionality |
|---|---|---|---|
| Polyether polyol (Voranol ™ NC 700, from Dow Chemical) | 79.5 | 2777 | 3 |
| Amine-terminated polyether | 15.0 | 1000 | 2 |
| Catalyst (SPI 847 from Specialty Products International) | 2.5 | | Catalyst |
| Organotin Catalyst (UL-1, from Air Products | 0.25 | | Catalyst |
| Organosilicone Surfactant (Tegostab B-8404, Goldschmidt) | 1 | — | Surfactant |
| Water | 2.0 | | Reactive blowing agent |
| Co Naphthenate | 0.5 | | Promoter |

The resulting polyol blend has an equivalent weight of 372.4.

C. Manufacture of Foam Example 3

An isocyanate component is prepared by blending 18.77 parts by weight of the isocyanate-terminated prepolymer from A above with 18.93 parts Sartomer 350 and 0.9 parts t-butyl peroxide. The isocyanate component is then mixed with 18.93 parts of the polyol component from B above, under the general conditions described in Example 1C. A closed-cell, low density rigid foam exhibiting slight shrinkage is obtained.

D. Manufacture of Foam Example 4

An isocyanate component is prepared by blending 32.17 parts of the isocyanate-terminated prepolymer from A above with 25.29 parts Sartomer 350 and 1.12 parts cumene hydroperoxide. The isocyanate component is then mixed with 36.92 parts of the polyol component from B above, under the general conditions described in Example 1C. A stable, closed-cell, low density rigid foam is obtained.

E. Manufacture of Foam Example 5

An isocyanate component is prepared by blending 25 parts of the isocyanate-terminated prepolymer from A above with 10 parts Sartomer 350 and 0.98 parts cumene hydroperoxide. The isocyanate component is then mixed with 28.65 parts of the polyol component from B above, under the general conditions described in Example 1C. A stable, closed-cell, low density rigid foam is obtained.

F. Manufacture of Foam Example 6

An isocyanate component is prepared by blending 17.5 parts of the isocyanate-terminated prepolymer from A above with 5 parts Sartomer 350 and 0.76 parts cumene hydroperoxide. The isocyanate component is then mixed with 20.04 parts of the polyol component from B above, under the general conditions described in Example 1C. A stable, closed-cell, low density semi-flexible foam is obtained.

What is claimed is:

1. A method of making a rigid hybrid polyurethane foam, comprising mixing an isocyanate component with a polyol component in the presence of (i) a blowing agent, (ii) at least one polyfunctional (meth)acrylate compound containing an average of at least 2 acrylate or methacrylate groups per molecule and a weight per acrylate or methacrylate group of about 300 daltons or less and (iii) at least one catalyst for the reaction of a polyol or water with a polyisocyanate and subjecting the mixture to conditions sufficient to cause the isocyanate component and polyol component to react and the polyfunctional (meth)acrylate compound to polymerize, thereby forming a rigid hybrid polyurethane foam having a bulk density of 45 pounds per cubic foot (720 kg/m³, or less, wherein the isocyanate component includes an isocyanate-terminated prepolymer having an isocyanate-equivalent weight of from about 150 to about 500 and an average functionality of about 2.7 to about 4.0.

2. The method of claim 1, wherein the polyfunctional (meth)acrylate compound contains an average of from 2.5 to 5 acrylate or methacrylate groups per molecule.

3. The method of claim 2, wherein the polyfunctional (meth)acrylate compound is blended with the isocyanate component prior to mixing the isocyanate component with the polyol component.

4. The method of claim 3 wherein the volume ratio of isocyanate component plus the polyfunctional (meth) acrylate compound) to the polyol component is from about 4:1 to about 1:4.

5. The method of claim 4 wherein the prepolymer as made by reacting a polymeric MDI having a free MDI content of from about 10–25% by weight with a polyol.

6. The method of claim 5, wherein the polyol component includes a polyol having an equivalent weight of about 1000 to about 3000 and a tertiary amino-containing polyol and/or an amine-functional compound.

7. The method of claim 3 wherein the mixed polyol and isocyanate components are dispensed onto a part and cured in place to produce a foam adhered to the part.

8. The method of claim 7 wherein the foam is a vibration-dampening, sound-dampening or reinforcing foam.

9. The method of claim 8 wherein the part is a structural member of a vehicle.

10. A two-component reactive system for making a hybrid polyurethane foam, comprising (a) a isocyanate component that contains at least one polyisocyanate compound and at least one polyfunctional (meth)acrylate compound containing an average of at least 2 acrylate or methacrylate groups per molecule and a weight per acrylate or methacrylate group of about 300 daltons or less;

(b) a polyol component that contains one or more polyols and an effective amount of a blowing agent;

wherein the system is further characterized by
 (i) a volume ratio of isocyanate component to polyol component of between 1:4 to 4:1,
 (ii) a ratio of isocyanate groups in the isocyanate component to isocyanate-reactive groups in the polyol component from about 0.8:1 to about 1.5:1 and
 (iii) at least one of the isocyanate component or the polyol component contains a catalyst for the reaction of an isocyanate with a polyol or water.

11. The reactive system of claim 10, wherein the polyfunctional (meth)acrylate compound contains an average of from 2.5 to 5 acrylate or methacrylate groups per molecule.

12. The reactive system of claim 11, wherein the isocyanate component includes an isocyanate-terminated prepolymer having an isocyanate equivalent weight of from about 150 to about 500 and average functionality of about 2.7 to about 4.0.

13. The reactive system of claim 12 wherein the volume ratio of isocyanate component to the polyol component is from about 4:1 to about 1:4.

14. The reactive system of claim 13 wherein the prepolymer is made by reacting a polymeric MDI having a free MDI content of from about 10–25% by weight with a polyol.

15. The reactive system at claim 14, wherein the polyol component includes a polyol having an equivalent weight of about 1000 to about 3000 and a tertiary amine-containing polyol and/or an amine-functional compound.

16. The reactive system of claim 12 wherein the prepolymer is a reaction product of an excess of an organic polyisocyanate compound, a hydroxyl-functional acrylate or methacrylate, and a polyol.

17. The reactive system of claim 10 wherein the polyfunctional (meth)acrylate compound is substantially devoid of hydroxyl, primary amine, secondary amine, carboxylic acid and thiol groups.

18. The method of claim 1 wherein the prepolymer is a reaction product of an excess of an organic polyisocyanate compound, a hydroxyl-functional acrylate or methacrylate, and a polyol.

19. A method of making a rigid hybrid polyurethane foam, comprising mixing an isocyanate component with a polyol component in the presence of (i) a blowing agent, (ii) at least one polyfunctional (meth)acrylate compound containing an average of at least 2 acrylate or methacrylate groups per molecule and a weight per acrylate or methacrylate group of about 300 daltons of less arid being substantially devoid of hydroxy, primary amine, secondary amine, carboxylic acid and thiol groups and (iii) at least one catalyst for the reaction of a polyol or water with a polyisocyanate and subjecting the mixture to conditions sufficient to cause the isocyanate component and polyol component to react and the polyfunctional (meth)acrylate compound to polymerize, thereby forming a rigid hybrid polyurethane foam having a bulk density of 45 pounds per cubic foot (720 kg/m$^3$) or less.

* * * * *